(12) United States Patent
Daoud et al.

(10) Patent No.: US 9,511,930 B2
(45) Date of Patent: Dec. 6, 2016

(54) LIGHT-WEIGHT COMPOSITE CARGO CONTAINER AND METHOD OF USE

(71) Applicant: Leading Lite Composites, LLC, Las Vegas, NV (US)

(72) Inventors: Christian Daoud, Las Vegas, NV (US); Mohammad Naghi Ghasemi-Nejhad, Honolulu, HI (US)

(73) Assignee: Leading Light Composites, LLC, Las Vegas, NV (US)

( * ) Notice: Subject to any disclaimer, the term of this patent is extended or adjusted under 35 U.S.C. 154(b) by 0 days.

(21) Appl. No.: 14/386,395

(22) PCT Filed: Mar. 8, 2013

(86) PCT No.: PCT/US2013/029880
§ 371 (c)(1),
(2) Date: Sep. 19, 2014

(87) PCT Pub. No.: WO2013/142096
PCT Pub. Date: Sep. 26, 2013

(65) Prior Publication Data
US 2015/0041461 A1     Feb. 12, 2015

Related U.S. Application Data

(60) Provisional application No. 61/613,960, filed on Mar. 21, 2012.

(51) Int. Cl.
*B65D 90/02* (2006.01)
*B65D 90/08* (2006.01)
(Continued)

(52) U.S. Cl.
CPC ............... *B65D 90/022* (2013.01); *B23P 6/00* (2013.01); *B65D 88/14* (2013.01); *B65D 90/08* (2013.01); *B65D 90/16* (2013.01); *B65D 90/22* (2013.01);
(Continued)

(58) Field of Classification Search
CPC  B65D 90/022; B65D 90/021; B65D 88/121; B65D 88/24; B32B 27/12; B32B 2260/046; B32B 2262/101; B32B 3/12; B32B 27/00
USPC .............................................. 220/1.5, 560.07
See application file for complete search history.

(56) References Cited

U.S. PATENT DOCUMENTS 5,065,890 A * 11/1991 Greenbaum ......... B65D 90/022
137/585
5,109,998 A * 5/1992 Bretschneider ...... B65D 90/021
220/1.5
(Continued)

FOREIGN PATENT DOCUMENTS

| EP | 0753470 A1 | 1/1997 |
|---|---|---|
| WO | WO 2010/045572 A1 | 4/2010 |
| WO | WO 2011/153322 A1 | 12/2011 |

*Primary Examiner* — Shawn M Braden
(74) *Attorney, Agent, or Firm* — Baker & Hostetler LLP

(57) ABSTRACT

A lightweight cargo container and methods of use, assembly, and repair are disclosed herein. Individual panels, frame components, base, and joints may be customized with composite materials to further improve strength-to-weight ratio. Some embodiments provide for a simplified manufacturing and assembly of cargo container, through standardization, while improving cost, time-to-produce, durability, and strength-to-weight ratios. The embodiments described herein provide a significant weight savings for all cargo containers, modern present-day composite containers included.

8 Claims, 17 Drawing Sheets

(51) Int. Cl.
  *B65D 88/14* (2006.01)
  *B65D 90/22* (2006.01)
  *B23P 6/00* (2006.01)
  *B65D 90/16* (2006.01)

(52) U.S. Cl.
  CPC ..... *Y10T 29/49718* (2015.01); *Y10T 29/49826* (2015.01)

(56) References Cited

U.S. PATENT DOCUMENTS

| | | | |
|---|---|---|---|
| 6,112,931 A * | 9/2000 | Booth | B65D 88/14 220/1.5 |
| 6,299,009 B1 * | 10/2001 | Ryziuk | B64D 9/00 220/1.5 |
| 6,489,623 B1 | 12/2002 | Peters | |
| 7,185,778 B1 * | 3/2007 | Palley | B65D 88/14 220/1.5 |
| 2004/0103613 A1 | 6/2004 | Salzsauler et al. | |
| 2005/0011890 A1 | 1/2005 | Adler | |
| 2005/0241549 A1 | 11/2005 | Gordon | |
| 2008/0223857 A1 | 9/2008 | Palley et al. | |
| 2010/0270318 A1 * | 10/2010 | Dagher | B65D 88/14 220/660 |
| 2011/0001009 A1 | 1/2011 | Reece | |
| 2011/0143081 A1 | 6/2011 | Fritz et al. | |
| 2011/0226425 A1 | 9/2011 | Forbis et al. | |
| 2011/0247958 A1 | 10/2011 | Lucas et al. | |

* cited by examiner

Connector 14

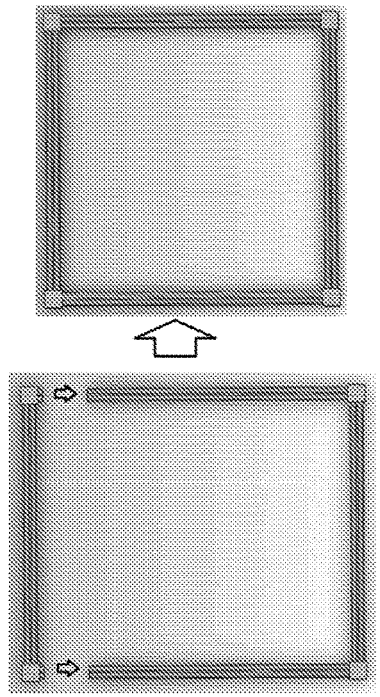
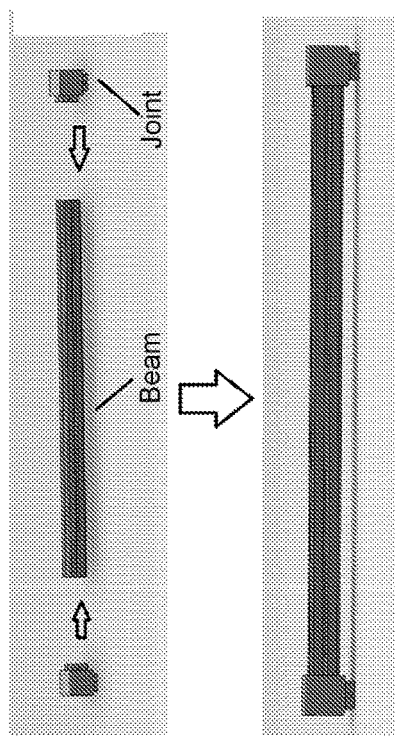
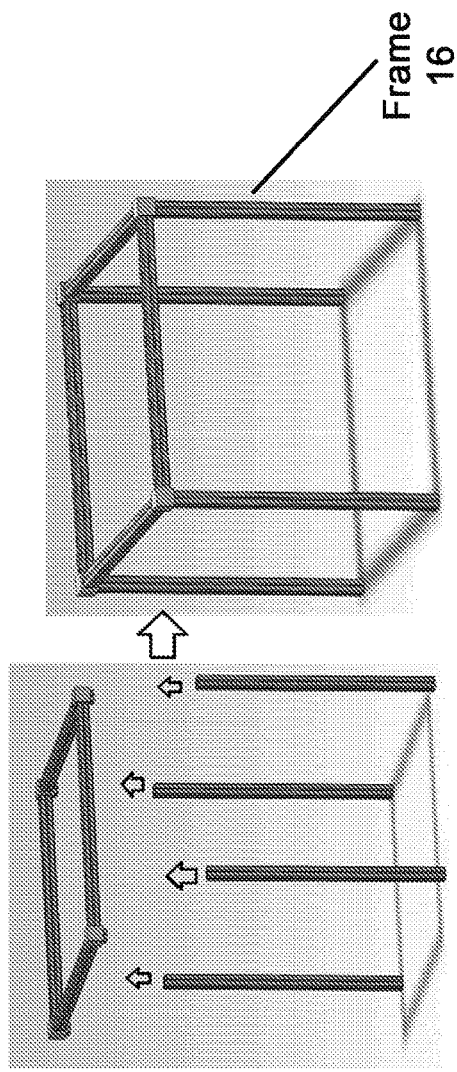
FIG. 10A

LIGHT-WEIGHT COMPOSITE CARGO CONTAINER AND METHOD OF USE

CROSS REFERENCE TO RELATED PATENT APPLICATIONS

This application is the National Stage of International Application No. PCT/US2013/029880, filed Mar. 8, 2013, which claims benefit of and priority to U.S. Provisional Application No. 61/613,960, filed Mar. 21, 2012, the entireties of which applications are incorporated herein by reference for any and all purposes.

FIELD OF THE INVENTION

The disclosed invention is in the field of cargo containers.

BACKGROUND

A unit load device (ULD), is a pallet or container used to load luggage, freight, and mail on wide-body aircraft and specific narrow-body aircraft. It allows a large quantity of cargo to be bundled into a single unit. Since this leads to fewer units to load, it saves ground crews time and effort and helps prevent delayed flights. Each ULD has its own packing list (or manifest) so that its contents can be tracked. As energy prices have increased the airline and shipping companies have become conscious of the weight of the ULDs. Thus, there is a need for a light-weight ULD. The invention is directed to these and other needs.

SUMMARY

The present invention provides unit load devices including a container comprising an assembly of composite laminates and configured to meet the geometry and loading requirements of one or more ULD standards, wherein the weight of the unit load device is less than about 50% of the weight of a corresponding all-aluminum unit load device.

The present invention also provides unit load devices including a base panel composed of one or more composite laminate materials; a frame including a frame first portion extending from the base panel along a first direction, a frame second portion extending from the frame first portion along a second direction that is perpendicular to the first direction, and a frame third portion extending from the frame first and second portions along a third direction that is perpendicular to the first and second directions, wherein the frame comprises composite laminate, and wherein the frame comprises the primary structure of the ULD; one or more side panels attached to the frame, the one or more side panels comprising composite laminate; and a top panel attached to an opposite end of the frame as the base panel, the top panel comprising composite laminate.

The present invention further provides unit load devices including a base panel; a frame including a frame first portion extending from the base panel along a first direction, a frame second portion extending from the frame first portion along a second direction perpendicular to the first direction, and a frame third portion extending from the frame first and second portions along a third direction perpendicular to the first and second directions; one or more side panels attached to the frame; a top panel attached to the frame, the top panel attached to an opposite end of the frame as the base panel; and a plurality of strips attached to an outer surface of the one or more side panels, wherein the one or more side panels defines a top portion adjacent to the top panel, a bottom portion adjacent to the base member, and a middle portion extending between the top and bottom portion, and wherein there is a greater number of the plurality of strips at the top and bottom portion of the one or more side panels with respect to the middle portion of the one or more side panels.

The present invention also provides methods of transporting a unit load devices, the unit load devices comprising a base panel; a frame including a frame first portion extending from the base panel along a first direction, a frame second portion extending from the frame first portion along a second direction perpendicular to the first direction, and a frame third portion extending from the frame first and second portions along a third direction perpendicular to the first and second directions; one or more side panels attached to the frame; a top panel attached to the frame, the top panel attached to an opposite end of the frame as the base panel; and a plurality of strips attached to an outer surface of the one or more side panels, wherein the one or more side panels defines a top portion adjacent to the top panel, a bottom portion adjacent to the base member, and a middle portion extending between the top and bottom portion, and wherein there is a greater number of the plurality of strips at the top and bottom portion of the one or more side panels with respect to the middle portion of the one or more side panels, the top panel having a similar configuration as the side panels. The method comprises transporting the unit load device via an airplane from a first location to a second.

The present invention also provides methods of assembling a frame of a unit load device, the frame including a plurality of unit beam members that are elongate along a first direction, each of the plurality of unit beam members defining a length along the first direction. The method comprises stacking the plurality of unit beam members to define a beam set, the beam set defining a length along the first direction approximately equal to each of the lengths of the plurality of unit beam members; and attaching a connecting member to the composite layer.

The present invention further provides methods of assembling a unit load device kit, the kit comprising a base panel; a frame; one or more side panels; a top panel; a plurality of strips attached to the one or more side panels, wherein the one or more side panels defines a top portion and a bottom portion opposite the top portion, and a middle portion extending between the top and bottom portion, wherein there is a greater number of the plurality of strips at the top and bottom portion of the one or more side panels with respect to the middle portion of the one or more side panels; and instructions for assembling the unit load device. The method comprises assembling the one or more side panels, the top panel, the base panel, and the frame to a plurality of connectors and brackets via a plurality of mechanical fasteners.

The present invention also provides methods of repairing a unit load device comprising one or more side panels, a top panel, a base panel, a plurality of beam set assemblies forming a frame, a plurality of connectors, a plurality of brackets, and a plurality of mechanical fasteners. The method comprises removing a damaged one of the one or more side panels, the top panel, the base panel, the plurality of beam set assemblies, the plurality of connectors, the plurality of brackets, or the plurality of mechanical fasteners; and attaching a new or repaired one of the one or more side panels, the top panel, the base panel, the plurality of beam set assemblies, the plurality of connectors, the plurality of brackets, or the plurality of mechanical fasteners.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 10A illustrates an example of assembling the frame 16.

DETAILED DESCRIPTION

Figure 1A:
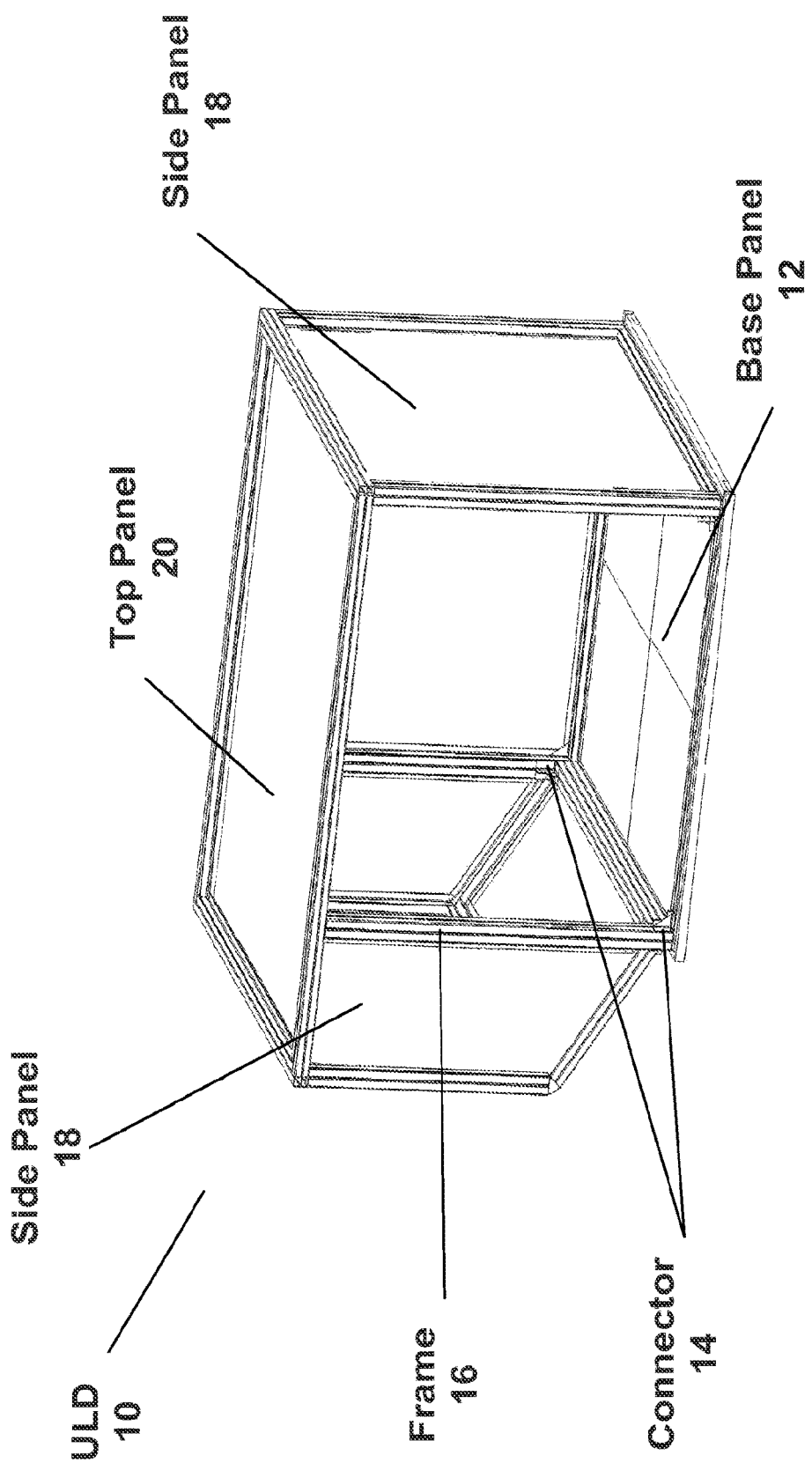
FIG. 1A illustrates a perspective view of a ULD including a base panel 12, a frame 16, one or more side panels 18, and a top panel 20.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

LIST OF ELEMENTS 10 is a unit load device (ULD);

12 is a base panel;

14 is a connector;

16 is a frame;

18 is a side panel;

20 is a top panel;

22 is an access door;

24 is a unit beam member;

26 is a strip;

28 is a beam set;

30 is a joint assembly bracket;

32 is a wrap;

34 is a corner fillet;

36 is a connection assembly;

38 is a frame-to-frame bracket; and 40 is a ply-drop.

Suitable unit load devices according to the present invention include a container comprising an assembly of composite laminates. Suitable containers can also be configured to meet the geometry and loading requirements of one or more ULD standards. The weight of the ULD is typically less than about 50% of the weight of a corresponding all-aluminum ULD. The ULD can also be configured to be fire resistant. Suitable composite laminates can comprise one or more of the following materials: Kevlar/epoxy, carbon/epoxy, S-Glass/epoxy, E-Glass/epoxy. It should be appreciated that these materials can be used alone or in any combination with each other. In some embodiments, the ULD is less than about 40% of the weight of the corresponding all-aluminum ULD.

The ULD can be configured to meet the ULD standards according to any one of the following ULD types: LD1, LD2, LD3, LD4, LD6, LD8, LD9, LD11, LD29, LD39, AQ6, AQ7, M6, or any equivalent ULD design standard. It should be appreciated that any ULD government standard or equivalent standard can be included in the ULD standards. It should be appreciated that various ULDs according to the inventions described herein can be readily adapted to meet the regulations for fire retardancy, geometry and structural standards, defined by the Federal Aviation Administration (FAA) in TSO-C90c, NAS 3610, or both. Examples of the geometric dimensions of several standard ULDs are provided in the following table:

TABLE

Volume indicated is internal volume.

| Container type | Volume | Linear dimensions (base width/overall width × depth × height) | Remarks |
| --- | --- | --- | --- |
| LD1 | 4.90 m³ (173 cu ft) | 156/234 × 153 × 163 cm (61.5/92 × 60.4 × 64 in) | contoured, half width |
| LD2 | 3.40 m³ (120 cu ft) | 119/156 × 153 × 163 cm (47/61.5 × 60.4 × 64 in) | contoured, half width |
| LD3 | 4.50 m³ (159 cu ft) | 156/201 × 153 × 163 cm (61.5/79 × 60.4 × 64 in) | contoured, half width, dimension according to IATA; available at 45" height for loading on Airbus A320 family |
| LD6 | 8.95 m³ (316 cu ft) | 318/407 × 153 × 163 cm (125/160 × 60.4 × 64 in) | contoured, full width, equivalent to 2 LD3s |
| LD8 | 6.88 m³ (243 cu ft) | 244/318 × 153 × 163 cm (96/125 × 60.4 × 64 in) | contoured, full width, equivalent to 2 LD2s; DQF- prefix |
| LD11 | 7.16 m³ (253 cu ft) | 318 × 153 × 163 cm (125 × 60.4 × 64 in) | same as LD-6 but without contours; rectangular |

Referring to the figures, base panel 12 of ULD 10 can include one or more layers. In one aspect of the invention, base panel 12 includes a layer that includes Kevlar/epoxy and carbon/epoxy hybrid composite laminate. The base panel 12 can also include a core layer that comprises honeycomb, foam, polycarbonate, polyurethane, or glass/epoxy. In some aspects, the base panel 12 comprises a first composite layer, a second composite layer, a third composite layer, and a core layer. The core layer can include honeycomb, foam, polycarbonate, or polyurethane. The first, second, and third composite layers can comprise any one or more of the following: Kevlar/epoxy, carbon/epoxy, S-Glass/epoxy, and E-Glass/epoxy. In some examples, the base panel 12 can comprise a Kevlar/epoxy and carbon/epoxy hybrid composite laminate or a Kevlar/epoxy, carbon/epoxy, and honeycomb composite laminate sandwich structure. In this manner the honeycomb comprises foam, polycarbonate, polyurethane, or glass/epoxy. The base panel 12 can also include a hard plastic material with bearing properties. Furthermore, the base panel 12 can define a layup of [[0/90]K, [0/90]c, [±45]Nomex]S'. It should be appreciated that the S' can denote an odd-symmetric or symmetric layup. Odd-symmetric refers to a layer being shared between the top and bottom portions of the stacking sequence at the mid-plane.

The frame 16 can include a frame first portion that extends from the base panel 12 along a first direction. The frame 16 can also include a frame second portion that extends from the frame first portion along a second direction that is perpendicular to the first direction. The frame 16 can also include a frame third portion that extends from the frame first and second portions along a third direction that is perpendicular to the first and second directions. The frame 16 can comprise composite laminate or any derivative thereof. It should be appreciated that the frame 16 comprises the primary structure of the ULD.

The frame 16 can include carbon/epoxy and glass/epoxy hybrid composite laminate. In some aspects, the frame 16 can comprise carbon/epoxy and glass/epoxy composite laminate tubing with a layup of [[0/90]C, [0/90]G]S. It should also be appreciated that the S denotes a symmetric layup. The frame 16 can also include one or more frame joint assembly brackets that can adjoin the unit beam members 24 individually or the plurality of unit beam members 24 to each other.

The frame 16 can also comprise a plurality of unit beam members 24. Furthermore, a composite layer can be wrapped around the plurality of unit beam members 24. The plurality of unit beam members 24 can be wrapped in a carbon/epoxy wrap. It should be appreciated that the plurality of unit beam members 24 can either be wrapped individually, or as the plurality of unit beam members 24, or both individually and as the plurality of unit beam members 24. In some examples, the plurality of unit beam members 24 includes four unit beam members.

The frame 16 can also include a plurality of connectors 14 adjoining the one or more side panels 18 and the top panel 20 to the frame 16. In this manner, the plurality of connectors 14 can be attached to the composite layer. The connectors 14 can comprise one or more of the following materials: a hard plastic material, a high strength polymer, and a polymer composite.

The one or more side panels 18 can be attached to the frame 16, such that the one or more side panels 18 are configured perpendicular to the base panel 12. The one or more side panels 18 can include a composite laminate or any derivative thereof. Specifically, the one or more side panels 18 can include S-Glass/epoxy, E-Glass/epoxy, or a hybrid composite laminate. Furthermore, the one or more side panels 18 can define a layup of [0/90]G.

The ULD can also include a plurality of strips 26 attached to an outer surface of the one or more side panels 18 and/or the top panel 20, as will be further discussed. The plurality of strips 26 can comprise a composite laminate or any derivative thereof. In some examples, the one or more side panels 18 can define a top portion adjacent to the top panel 20, a bottom portion adjacent to the base member. In this manner, a middle portion extends between the top and bottom portion. The plurality of strips 26 can be attached to the one or more side panels 18 such that there is a greater number of the plurality of strips 26 at the top and bottom portion of the one or more side panels 18 with respect to the middle portion of the one or more side panels 18. It should be appreciated that the plurality of strips 26 can be attached in a ply-drop construction configuration.

The top panel 20 can be attached to an opposite end of the frame 16 as the base panel 12. The top panel 20 can include a composite laminate or any derivative thereof. Specifically, the top panel 20 can include S-Glass/epoxy, E-Glass/epoxy, or a hybrid composite laminate. Furthermore, the top panel 20 can define a layup of [0/90]G.

Similar to the one or more side panels 18, the top panel 20 can define a first portion and a second portion opposite the first portion. In this manner, the top panel 20 can also define a middle portion that extends between the first and second portions. The plurality of strips 26 can also be attached to the top panel 20 such that there is a greater number of the plurality of strips 26 at the first and second portions of the top panel 20 with respect to the middle portion of the top panel 20. It should also be appreciated that the top panel 20 can have a plurality of strips 26 attached in a ply-drop construction configuration.

The ULD can also include the access door 22, which can be attached to the frame 16. In this manner, the ULD defines an opening, and the access door 22 is configured to cover the opening.

The composite laminate can be fire resistant in accordance with Federal Aviation Regulation (FAR) requirements. In some examples, the composite laminate is in accordance with FAR 25. It should be appreciated that the composite laminate can be in accordance with any of the standards specified in TSO-C90C (Technical Standard Orders) and/or NAS3610 (National Aerospace Standard). Fire resistance can be implemented using suitable fire-resistant composite materials, such as by using halogen-containing additives or resins that are commercially available.

It should also be appreciate that in any aspect of this invention, the composite laminate can include woven fabric material or unidirectional tape.

The present invention also includes a method of transporting a ULD, the method comprising transporting the ULD via an aircraft from a first location to a second. In some aspects, the ULD is received on the aircraft before transporting the ULD. Specifically in some examples, the ULD is received in an interior belly of an aircraft. ULDs can also be in the upper deck as well as the lower deck of aircraft. It should be appreciated that the ULDs described herein can be adapted for use in any type of aircraft, such as airplanes, helicopters, as well as any number of variations thereof.

Figure 2:
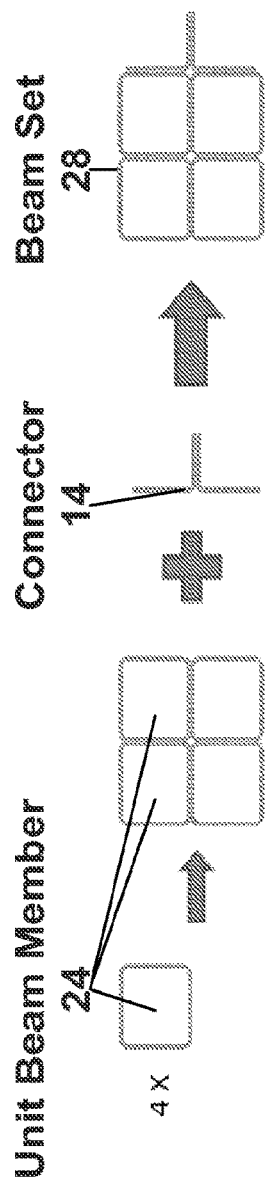
FIG. 2 illustrates a side-view of a beam set 28 including unit beam members 24 and one or more connectors 14.
Figure 10B:
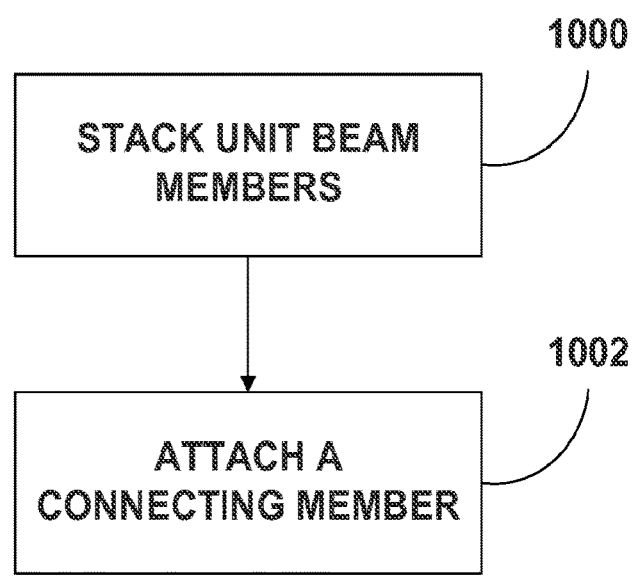
FIG. 10B is a flow-chart illustrating a method of assembling the frame 16.

As illustrated in FIG. 10B, the present invention also includes a method of assembling the frame 16 of the ULD. Again, it should be appreciated that the ULD may comprise any variation of the structural aspects previously recited. As shown in FIG. 2, the frame 16 can include a plurality of unit beam members 24 that are elongate along a first direction. Each of the plurality of unit beam members 24 can define a length along the first direction. The method can include stacking the plurality of unit beam members 24 to define a beam set 28 (1000). In this manner, the beam set 28 can define a length along the first direction approximately equal to each of the lengths of the plurality of unit beam members 24. The method can also include attaching a connecting member to the composite layer (1002). In some aspects, the connecting member is attached to the composite layer via adhesive or mechanical fasteners. It should be appreciated that mechanical fasteners can refer to any of the following: screws, bolts, studs, nuts, rivets, or any fastener capable of mechanically fastening two or more members.

In some aspects the method includes wrapping a composite layer around the beam set 28. The composite layer can include a carbon/epoxy wrap. It should be appreciated that the beam set 28 can also be referred to as a plurality of unit beam members 24, and these terms can be used interchangeably. In this manner, the plurality of unit beam members 24 can either be wrapped individually, or as the plurality of unit beam members 24, or both individually and as the plurality of unit beam members 24.

In some examples, the plurality of unit beam members 24 includes four unit beam members, which can be defined as a first, second, third, and fourth unit beam members. In some examples, the first, second, third, and fourth unit beam members comprise carbon/epoxy and glass/epoxy.

The beam set 28 (or plurality of unit beam members 24) can define a substantially square cross-section. The beam set 28 can also have a cross-section substantially defined by a triangle, circle, oval, balbis, quadrilateral, pentagon, hexagon, heptagon, octagon, nonagon, or polygon. In some examples, each of the first, second, third, and fourth unit beam members can have a cross-section substantially defined by a triangle, circle, oval, balbis, quadrilateral, pentagon, hexagon, heptagon, octagon, nonagon, or polygon. In some examples, the first, second, third and fourth unit beam members comprise a substantially square cross-section tubing with a composite layup of [[0/90]C, [0/90]G]S. It should be appreciated that S denotes a symmetric layup. Furthermore, it should be appreciated that the first, second, third and fourth unit beam members can be wrapped by composite layers.

In another aspect the method includes attaching plurality of connectors 14 to the frame 16. The plurality of connectors 14 can adjoin the one or more side panels 18 and the top panel 20 to the frame 16. In this manner, the plurality of connectors 14 can be attached to the composite layer. The plurality of connectors 14 can comprise one or more of the following materials: a hard plastic material, a high strength polymer, and a polymer composite.

In some aspects of the method, the frame 16 can also include one or more frame joint assembly brackets that can adjoin the unit beam members 24 individually or the plurality of unit beam members 24 to each other.

The present invention also includes a method of assembling a unit load device kit. The kit can include a base panel 12, a frame 16, one or more side panels 18, a top panel 20, a plurality of strips 26 attached to the one or more side panels 18, and instructions for assembling the unit load device. In some aspects the one or more side panels 18 can define a top portion and a bottom portion opposite the top portion, and a middle portion extending between the top and bottom portion. The plurality of strips 26 can be attached to the one or more side panels 18, such that there is a greater number of the plurality of strips 26 at the top and bottom portion of the one or more side panels 18 with respect to the middle portion of the one or more side panels 18. The method can include assembling the one or more side panels 18, the top panel 20, the base panel 12, and the frame 16 to a plurality of connectors 14 and brackets via a plurality of mechanical fasteners, as illustrated in FIG. 1A.

The ULD design can be modular and built in parts. This can be achieved because all the major components (including but not limited to the base panel 12, frame 16, one or more side panels 18, top panel 20, and/or plurality of strips 26) can be joined mechanically via standard mechanical fasteners (such as screws, bolts, studs, nuts, rivets, etc.). In another embodiment, the side panels and top panels can be manufactured using a ply-drop methodology having strips staggered towards the edges of the panels where they are connected to the frame through the connectors, and are co-cured with the panels as one piece. As well, the kit can be assembled using traditional mechanical tools (such as drill bits, screw drivers, adjustable/pneumatic/power wrenches, rivet drivers, etc.). In this manner, the kit can also include any of the mechanical fasteners and/or mechanical joining tools.

Furthermore, all major components of the ULD can be manufactured and assembled to specifications. In some aspects, the major components will have all or some of the holes pre-drilled (pilot holes). In some aspects, the holes are not pre-drilled and the kit further includes a template tool for drilling the holes.

In some aspects, an end user receives the kit at a remote location. The end user can unpack the kit, and assemble the ULD. In this manner, an assembly pattern or instructions can be provided in the kit. Furthermore, the kit can also include a maintenance manual.

Figure 14:
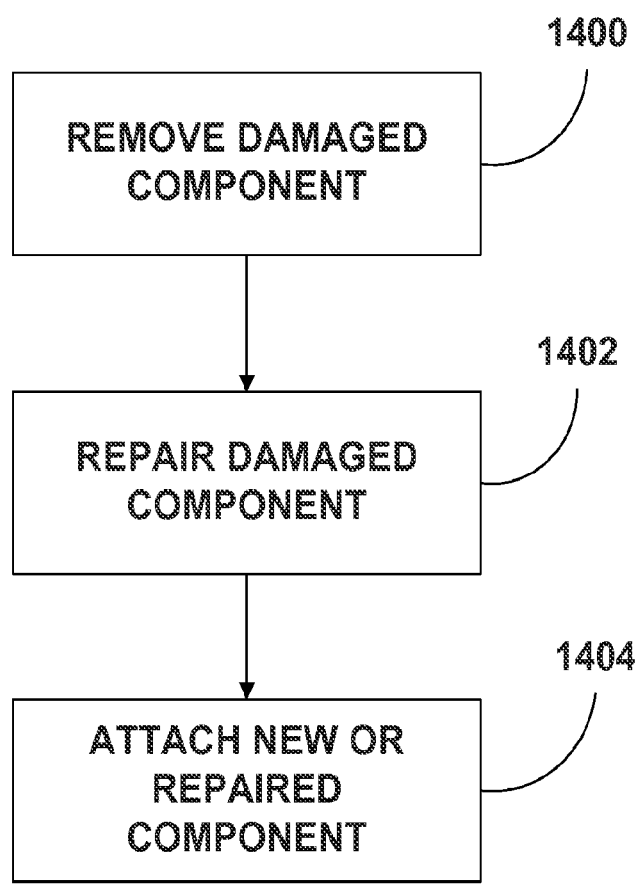
FIG. 14 is a flow-chart illustrating a method of repair the ULD.

As illustrated in FIG. 14, the present invention also provides a method for repairing the ULD. The ULD can include one or more side panels 18, a top panel 20, a base panel 12, a plurality of beam set 28 assemblies, a plurality of connectors 14, a plurality of brackets, and a plurality of mechanical fasteners. It should be appreciated that the ULD may comprise any variation of the structural aspects previously recited. The method can include removing a damaged one of the one or more side panels 18, the top panel 20, the base panel 12, the plurality of beam set 28 assemblies, the plurality of connectors 14, the plurality of brackets, and/or the plurality of mechanical fasteners (1400). In some examples, the repair methods includes repairing the damaged one of the one or more side panels 18, the top panel 20, the base panel 12, the plurality of beam set 28 assemblies, the plurality of connectors 14, the plurality of brackets, or the plurality of mechanical fasteners (1402). The method can also include attaching a new or repaired one of the one or more side panels 18, the top panel 20, the base panel 12, the plurality of beam set 28 assemblies, the plurality of connectors 14, the plurality of brackets, and/or the plurality of mechanical fasteners (1404). It should be appreciated that these steps can be performed in any combination and in any order.

The one or more side panels 18, top panel 20, base panel 12, plurality of beam set 28 assemblies, plurality of connectors 14, the plurality of brackets, and/or the plurality of mechanical fasteners can be removed from or attached to the ULD via traditional mechanical tools. The removal and replacement can be described in the instructions and/or the maintenance manual.

It should be appreciated that the repair can be made to the ULD without removing any of the one or more side panels 18, top panel 20, base panel 12, plurality of beam set 28 assemblies, plurality of connectors 14, the plurality of brackets, and/or the plurality of mechanical fasteners. For example, if any one of the one or more side panels 18 is punctured or scraped by a localized impact, such as a fork lift, the damaged area can be repaired using an "adhesive patch," which is glued over the damaged area to repair it as well as protect it from further damage growth, such as crack propagation.

Figure 3:
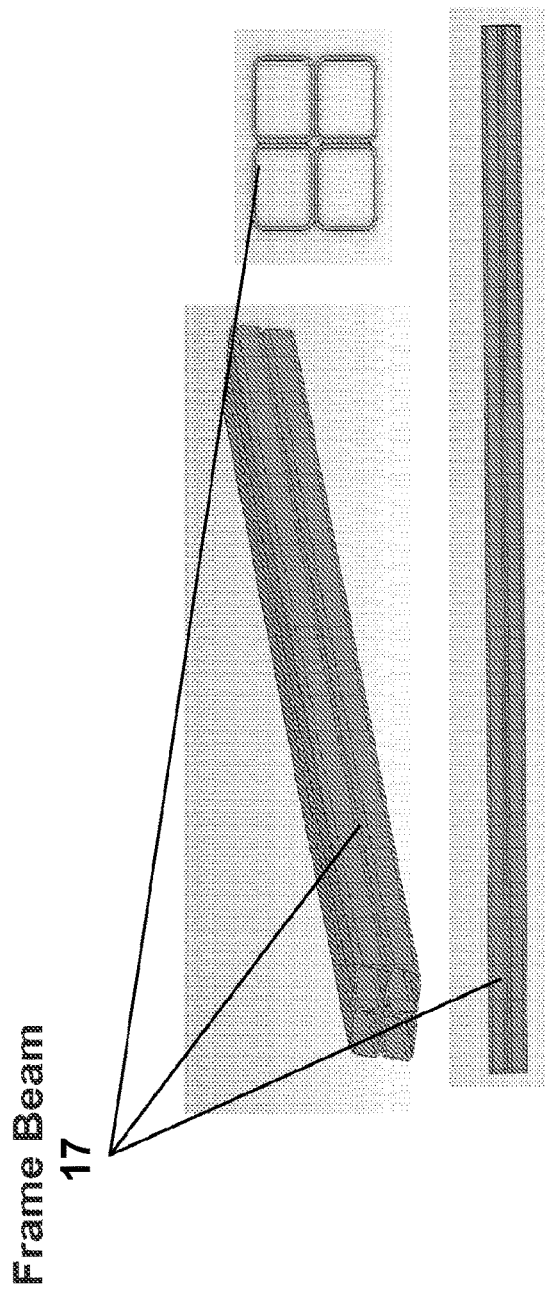
FIG. 3 illustrates a perspective view of the frame beam 17.

As illustrated in FIGS. 2 and 3, an aspect of this invention is to build a frame structure that is lightweight, high-strength, with streamline-manufacturing capability and easy to assemble/disassemble/repair. Some composite materials are stronger in tension than compression. The majority of the loading of ULDs can be bending, which includes tensile and compressive stresses. The main structure can be made from and consists of unit beam members 24 that are assembled together and joined at the edges.

Figure 4:
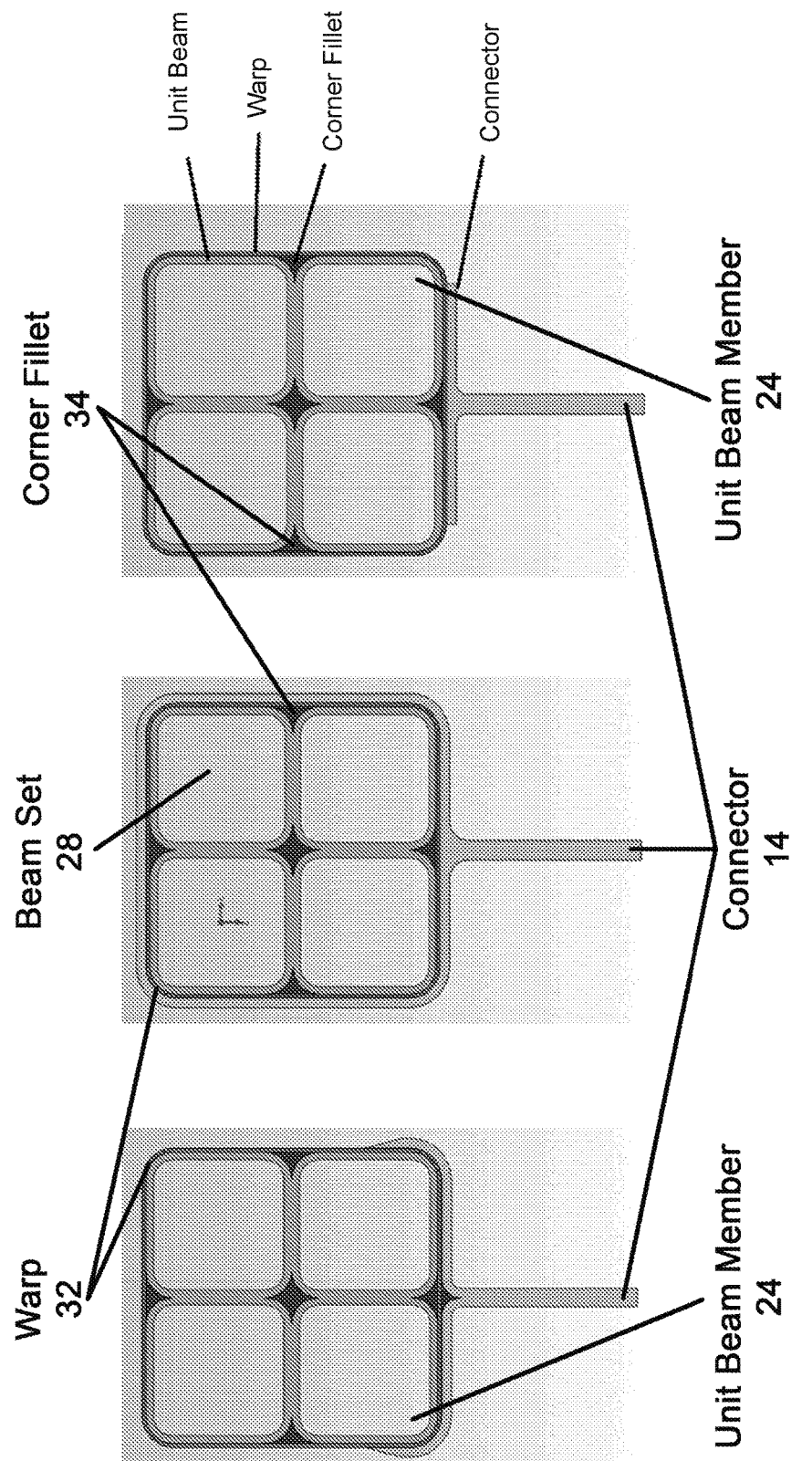
FIG. 4 illustrates a side-view of a beam set 28 including unit beam members 24, wrap 32, and corner fillet 34, and one or more connectors 14.
Figure 5:
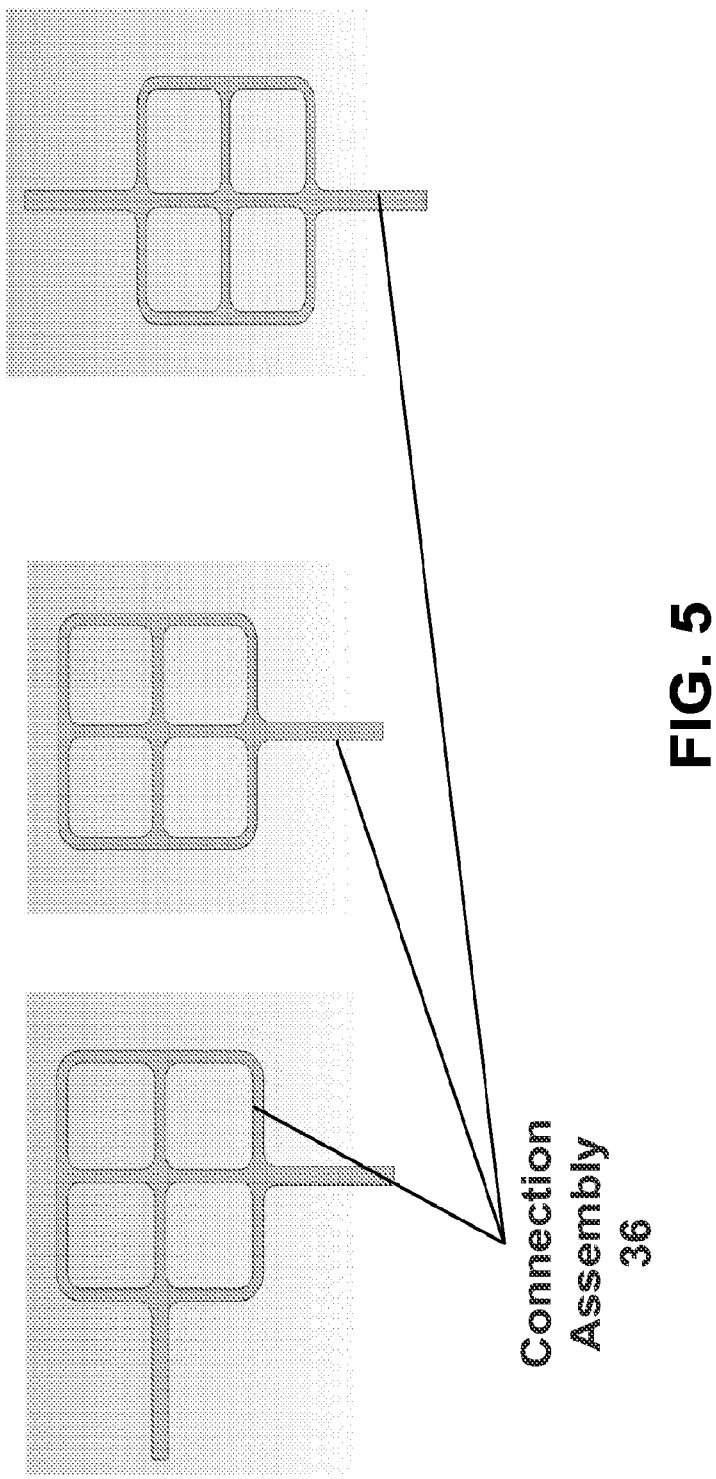
FIG. 5 illustrates a side-view of a connection assembly 36.
Figure 6:
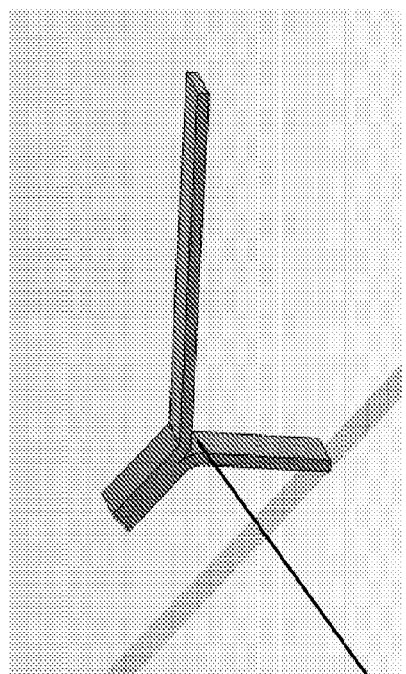
FIG. 6 illustrates a perspective view of a connector 14.

As illustrated in FIG. 3, the frame 16 can be the primary structural member of the ULD. The frame 16 can comprise three or more unit beams which can be uniform in size and material composition, designed to maintain consistency in the structure as well as ease of manufacturability, and optimized production cost. Prior to connecting the connector 14 to the unit beam members 24, the members can be wrapped in one or more composite layers for structural efficiency and performance. As illustrated in FIGS. 4-6, the connectors 14 can be connected to the plurality of unit beam members 24 by adhesive as well as mechanical joints. The connectors 14 can be used to connect the panels to the frames. The frame 16 can be connected to the connectors 14 by mechanical joints, to facilitate assembly and disassembly. The corners of the unit beam members 24 can be filled with corner fillet 34. The unit beam members 24 can be wrapped with a wrap 32. The combination of these components defines a beam set 28. As illustrated in FIGS. 4 and 5, a connector 14 can further be attached to the beam set 28. The connector 14 can be attached via adhesive or any type of mechanical fastener as disclosed herein. FIG. 5 illustrates various connections of the beam set 28 with the connector 14. It should be appreciated one or more connectors 14 can be attached at any surface of the beam set 28.

Figure 7:
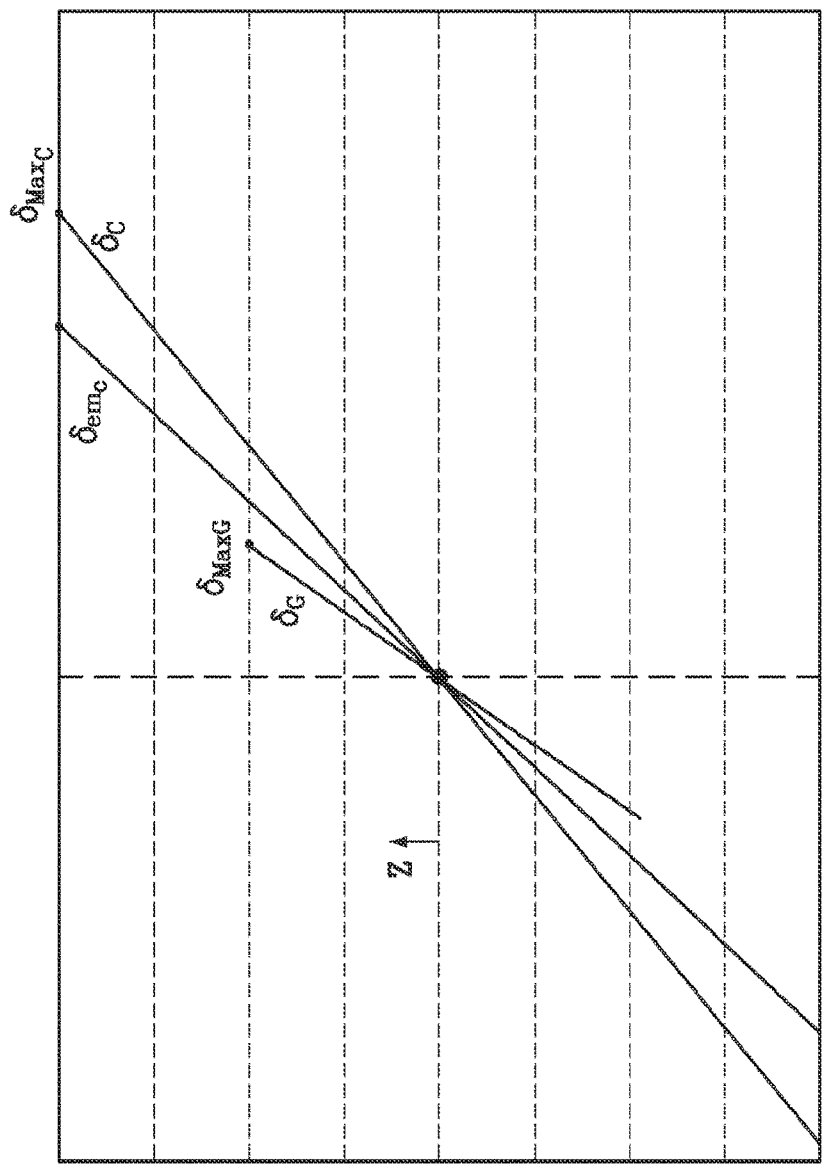
FIG. 7 illustrates schematically a Ply-by-Ply Factor of Safety (FOS) and anisotropic failure analysis for the frame unit beam set assembly hybrid composite structure as well as for the base panel hybrid and sandwich composite structure.

The frame 16 can be specifically designed to create a very strong structure with high structural integrity and efficiency. The frame 16 can be made of carbon/epoxy (c) and glass/epoxy (G) hybrid woven composite laminate with the following lay-up: $[[0/90]_C, [0/90]_G]_S$. It should appreciated that a [0/90] configuration for the unit beam lay-up is preferable. Without being limited by any theory of operation, it is believed that when a hollow beam forming the unit beams used within the frame described herein bend, the top and bottom portions will be under normal stresses (i.e., tension and compression), and hence it requires a [0/90] configuration for the entire wall thickness of the hollow beam with high strength materials such as carbon/epoxy and S-glass/epoxy. In some embodiments, [0/90] can also be replaced with [±45] and S-glass/epoxy with E-glass/epoxy. The [0/90] or [±45] represent a woven ply. In some embodiments unidirectional tapes can be used in place of woven materials (e.g., a [0/90] woven layer, can be replaced by a 0-layer and then a 90-layer of unidirectional composite, and so on). This hybrid design balances the weight-to-cost-to-strength ratios. FIG. 7 illustrates the schematic of a frame unit beam set assembly failure analysis and the determination of Factor of Safety (FOS) for this efficient anisotropic hybrid composite structure with a ply-by-ply novel design and failure analysis. The polymer matrix material can be compatible with each of the fiber system and is a fire resistant type in accordance with FAR 25 requirements.

In other embodiments, the material concept for the base panel with the layup of $[[0/90]_K, [0/90]_C, [±45]_{Nomex}]_S$, can follow an I-beam structure with higher strength properties at the outside (i.e., carbon/epoxy and Kevlar/epoxy) with [0/90] configuration to take up most of the normal stresses, and lower strength properties on the inside (i.e., either a honeycomb, foam, polycarbonate, polyurethane, E-glass/epoxy, or S-Glass/epoxy with [±45] configurations) to take up shear stresses. It should be appreciated that Kevlar/epoxy composite layers can be used at the outside layers of the base panel to provide friction and wear resistant material to minimize the wear and tear of the base panel. A hard bearing plastic, such as Delrin, is also used at the base of the base panel to further provide friction and wear resistance to prolong the life of our ULD. The bottom panel of the ULD can protect the aircraft should there be any impacts from the cargo inside the ULD, and can protect the cargo inside from any surrounding impact forces and environmental factors. The Kevlar/epoxy layers as the outside layers of the base panel further help the impact resistance performance of the base panel. This novel hybrid and sandwich design concept can balance the weight-to-cost-to-strength ratios. FIG. 7 also illustrates the schematic of the base panel failure analysis and determination of Factor of Safety (FOS) for this efficient anisotropic hybrid and sandwich composite structure with a ply-by-ply novel design and analysis.

Figure 8:
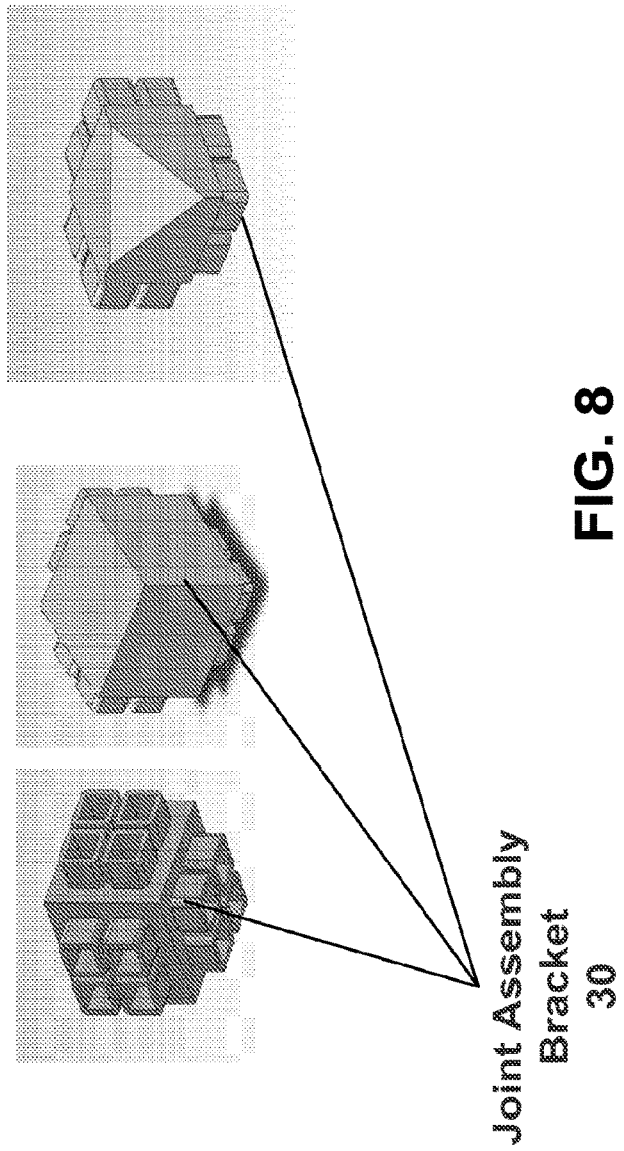
FIG. 8 illustrates a perspective view of a joint assembly bracket 30.
Figure 9:
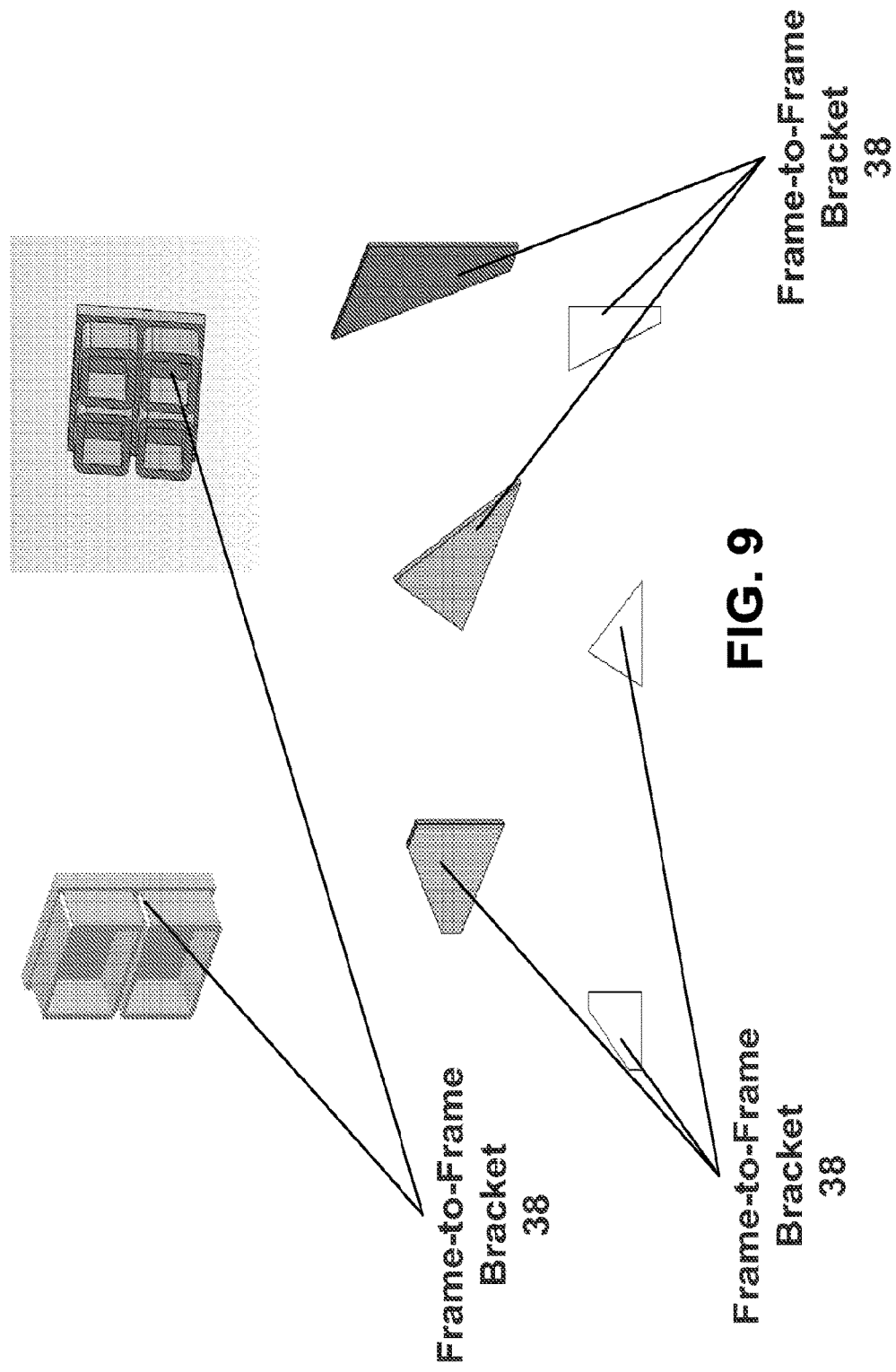
FIG. 9 illustrates a perspective view of a frame-to-frame bracket 38.

As illustrated in FIGS. 8 and 9, a joint assembly bracket 30 can be used for joining the beam set. Suitable joint assembly brackets are made of plastic (or composite) material or any other high wear resistance material with good structural properties. For ease of production, a composite laminate is created and the uniquely shaped brackets are machined using a high precision cutting system.

The joining of all members can be accomplished by the use of mechanical fasteners at the manufacturing level, due to the desire for ease of assembly/disassembly as well as repairs and services. The ULD components can alternatively be manufactured as a kit and shipped with the assembly instructions to the user for the on-site assembly.

As illustrated in FIGS. 8 and 9, the joint assembly bracket 30 and the frame-to-frame bracket 38 can be specifically designed to create a structure with high integrity while accomplishing ease of assembly/disassembly. Joint assembly bracket 30 and frame-to-frame bracket 38 can be made of any one or combination of the following materials: high strength thermal plastic material; polyurethane material; chopped fiber/resin composites; composites, or any material as previously mentioned.

Figure 11:
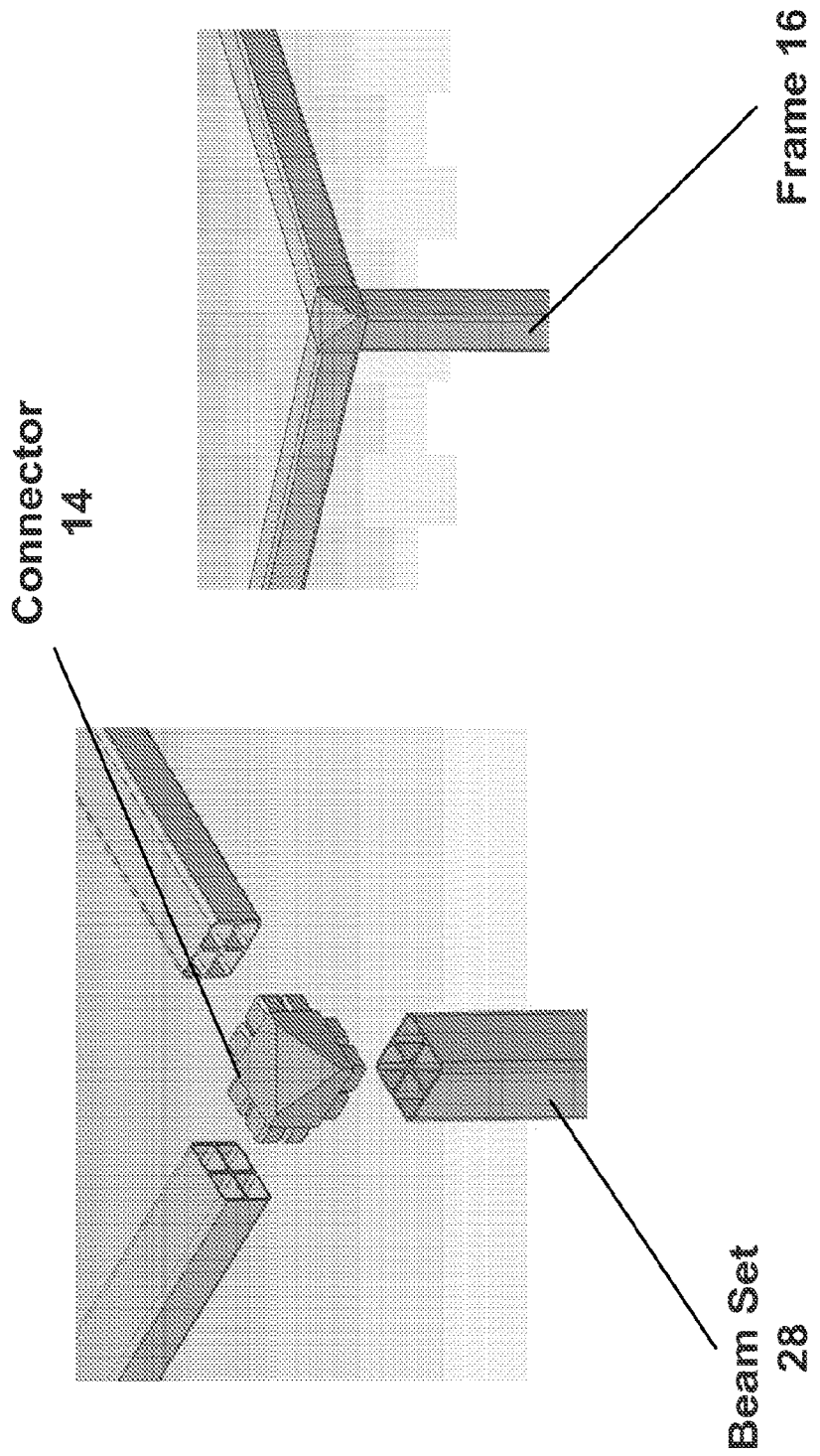
FIG. 11 illustrates a perspective view of the frame 16.
Figure 12:
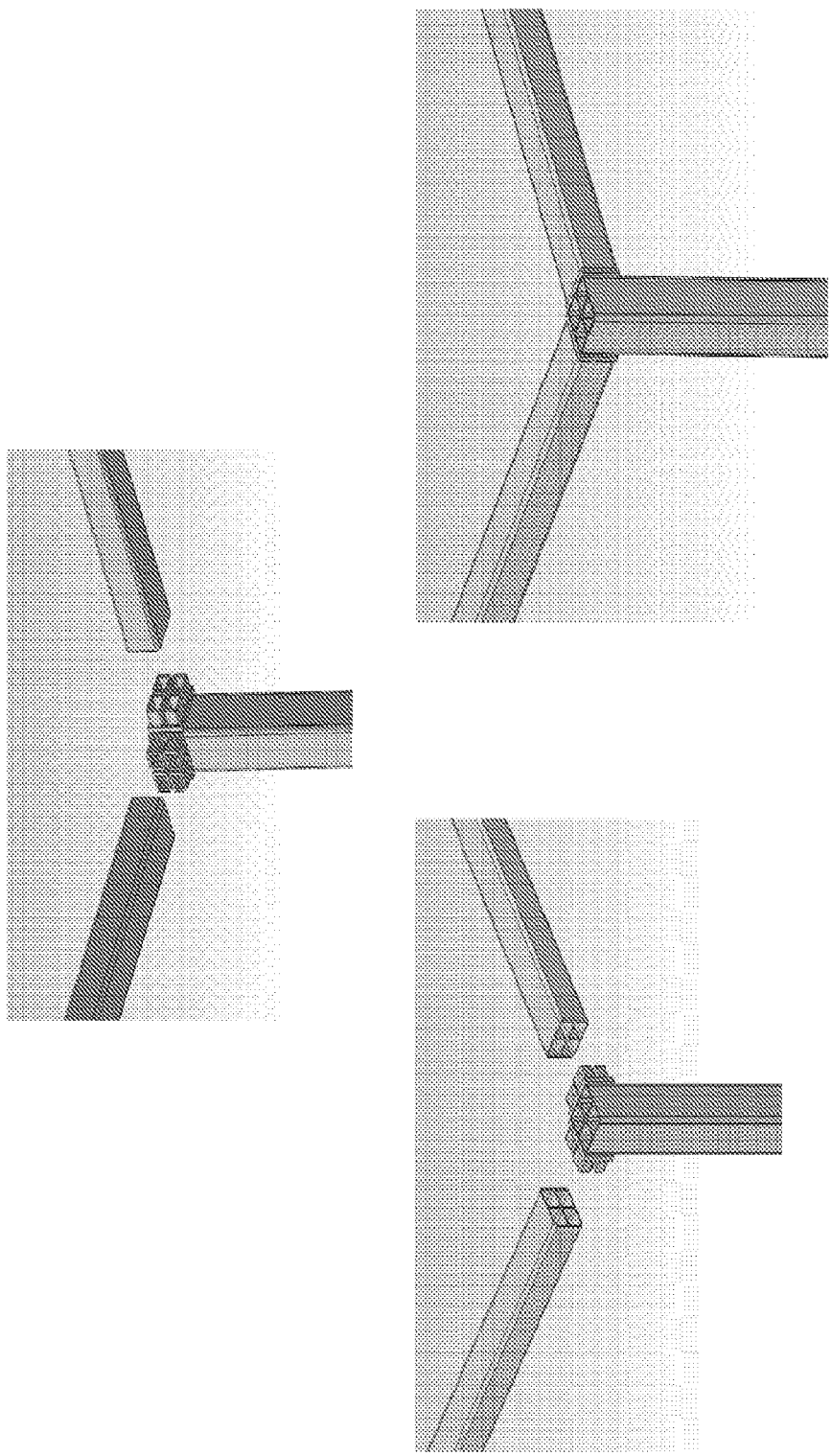
FIG. 12 illustrates a sample joint assembly.

FIGS. 10A and 11-12 illustrates one of many suitable ULD assembly processes. The order of the assembly is shown in FIGS. 10A and 11-12 from top to bottom as well as other assemblies and in the order of the arrows shown.

Figure 13:
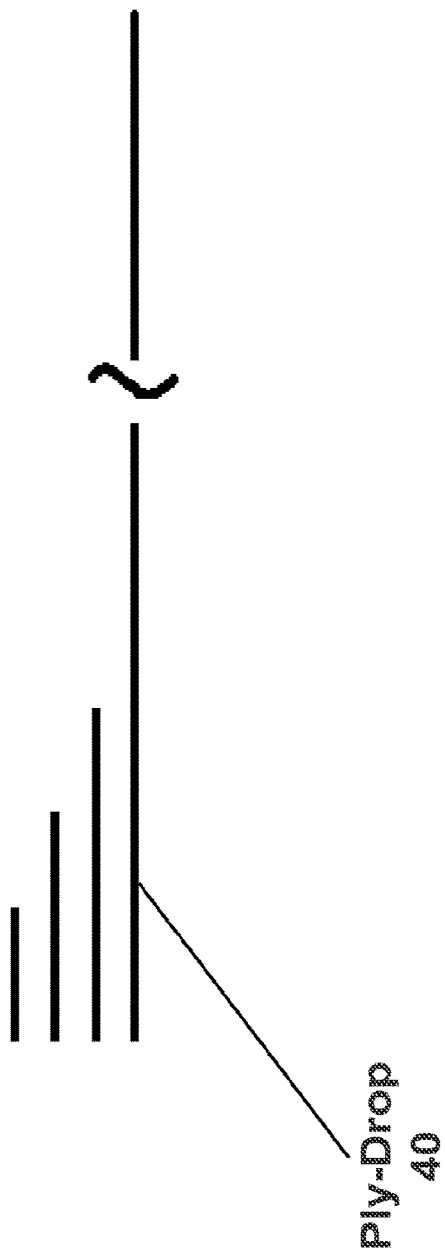
FIG. 13 illustrates a schematic of ply-drop at the frame-to-panel interface/joint.

The side and top panels of the ULD can protect the aircraft should there be any impacts from the cargo inside the ULD, and can protect the cargo inside from any surrounding impact forces and environmental factors. Similar to other ULD components, the one or more side panels can be lightweight and durable. The materials design chosen for the exterior side panels can be S-Glass/epoxy composite laminate with a single thick weave $[0/90]_G$. Additionally, to manage stress concentrations at joints, staggered, step-up-type strips of composite materials can be added to the outer perimeter of each side as well as top panel functioning as interface between the frame 16 and the one or more side panels 18 and the top panel 20. The ULD can minimize its weight and maximize its performance by using these strips. These strips can be staggered such that their numbers gradually decrease as one moves from the frame/panel interface region towards the center of the panel (similar to a ply-drop composite structure design; e.g., see FIG. 13). This approach can mimic the stress distribution (i.e., providing more materials where the stresses are higher), and hence provide materials where needed locally and strategically, leading to an optimum structure in terms of weight and costs. The polymer matrix material can be compatible with each respective fiber and can be fire resistant type in accordance with FAR 25 requirements.

Figure 1B:
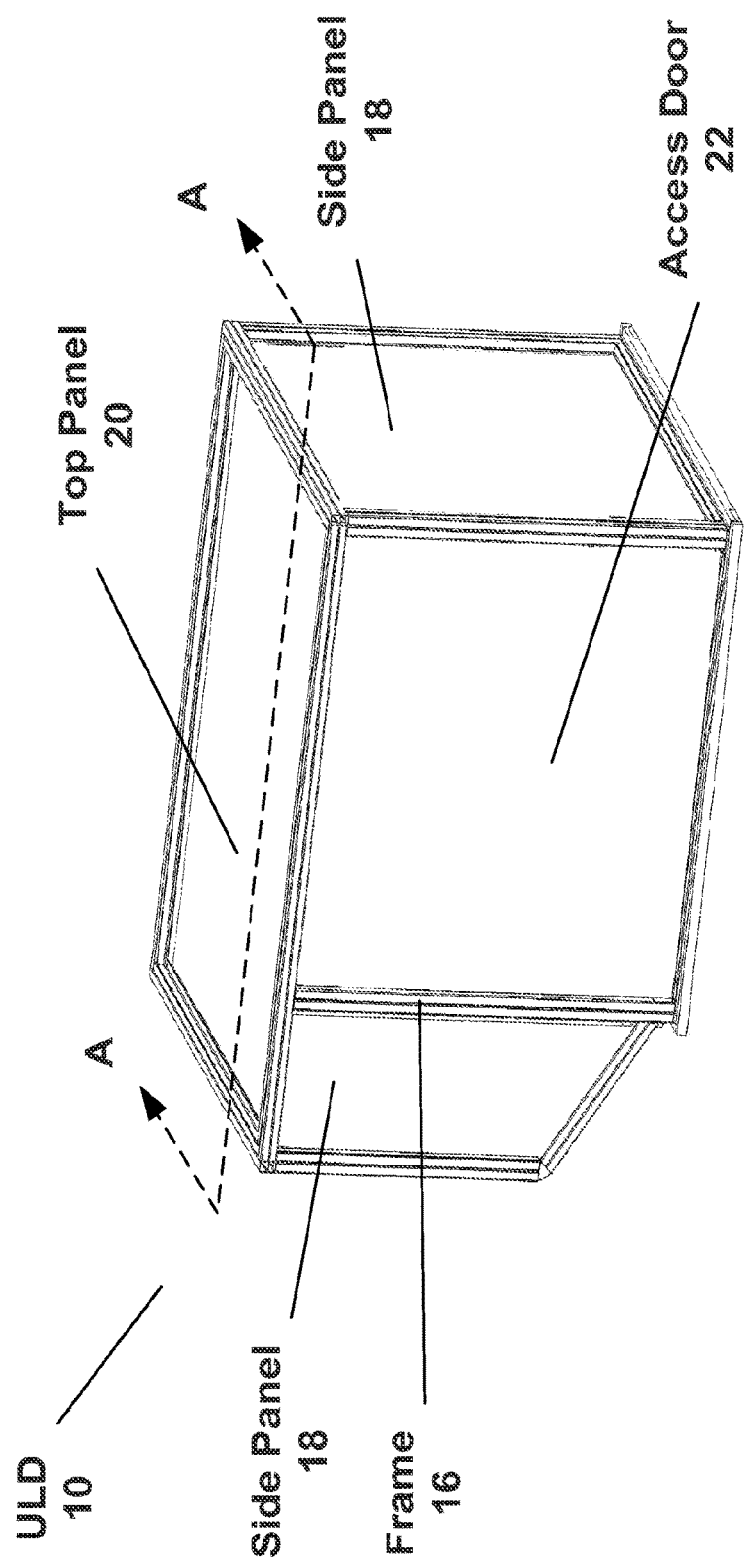
FIG. 1B illustrates a perspective view of the ULD from FIG. 1A further including an access door 22.
Figure 1C:
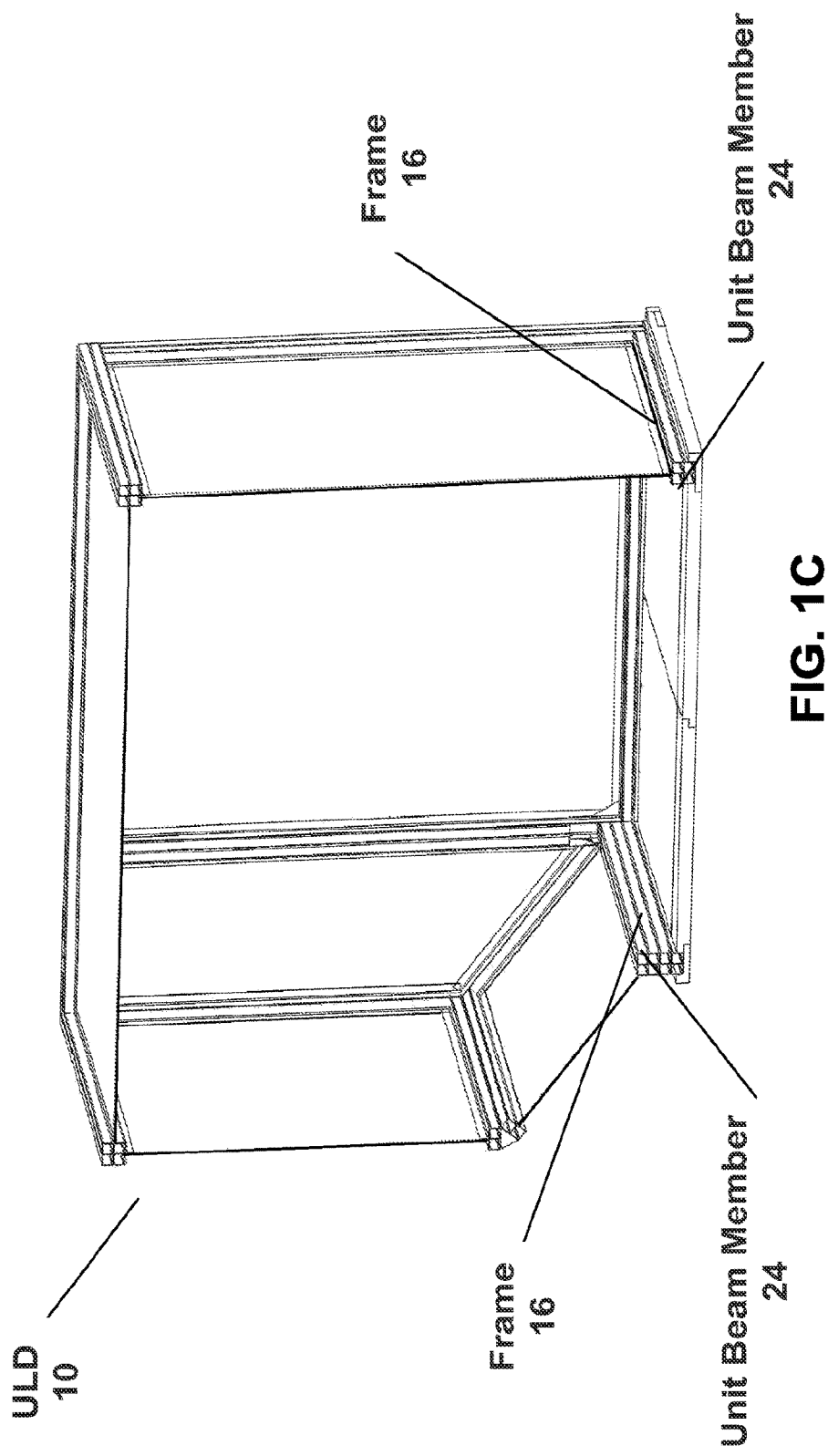
FIG. 1C illustrates a cross-section view of the frame 16 further including one or more unit beam members 24.

The ULD base can be made of 100% composite material and can be composed of different components to provide ease of assembly/disassembly (e.g., for in-service removals and repairs; as illustrated in FIGS. 1A-1C).

In one example, five components make up the base of the ULD. The outer frame of the base can be shaped to help conform to requirements set forth by NAS3611. The design chosen for this frame can be Kevlar/epoxy and carbon/epoxy hybrid composite laminate comprised of $[[0/90]_K, [0/90]_c]_S$. Kevlar/epoxy is useful for impact- and wear-resistance and carbon/epoxy is useful for strength and stiffness. In some embodiments, both the outer frame and the base can be made using Kevlar/epoxy, carbon/epoxy, 5-Glass/epoxy, E-Glass/epoxy or any combination thereof; and the orientations can be either [0/90] or, [±45]. An outer bumper and shell can be made from a high bearing material (such as Delrin) to prevent hard impacts and assist the fork lift to slip/slide underneath the ULD instead of striking the frame.

The inner main hub, can be housed by the outer frame from one side, the main ULD frame in the middle, and the floor panel from the other side. The members are suitably assembled together to maximize the structural advantages of the composite materials. Suitable composite materials for the inner main hub can be made from Kevlar/epoxy, carbon/epoxy, nomex honeycomb sandwich comprised of $[[0/90]_K, [0/90]_c, [\pm45]_{Nomex}]_S$, where the honeycomb can be replaced by a foam, polycarbonate, polyurethane, S-Glass/epoxy or E-Glass/epoxy, as well as combinations and variants thereof.

The base panel can have other a) composite materials construction and b) design (e.g., see the following for an example for each). For example, a single laminate base panel made of either Kevlar/epoxy, carbon/epoxy, S-Glass/epoxy or E-Glass/epoxy, or a combination; and the orientations can be either [0/90] or, [±45]). Furthermore, the panels can be interlocked as illustrated in FIGS. 1A-1C. In one example, honeycombs for both inner hub and panel can be about one half inch thick and can be milled to final shapes.

The joining of all members can be accomplished by the use of mechanical fasteners along with inserts. In some embodiments it is desired to minimize the use of adhesive to enable assembly and disassembly of the ULD, as well as to enable repairs and services. The access door 22 can be made of conventional curtain material that is commonly used on various certified ULDs.

Furthermore, the assembly of the ULD can be designed to ease the in-service support. All major sections can be easily replaceable. Furthermore, all components mentioned herein can be easily replaceable. This may help maximize the in-service time as well as exponentially prolong the life expectations of the ULD.

The above description is intended to be illustrative, and not restrictive. As such, the above embodiments and aspects thereof may be used in combination with each other. Many other embodiments will be apparent to those skilled in the art after reading the above description. While the foregoing written description of the present application enables one of ordinary skill to make and use the claimed features of the present application, those of ordinary skill will understand and appreciate the existence of variations, permutations, combinations, equivalent means, and equivalents of the specific embodiments, methods, and examples herein. The present application should therefore not be limited by the above described embodiments, methods, and examples, but by all embodiments and methods within the scope and spirit of the present application as claimed.

What is claimed:

1. A unit load device (ULD) comprising:
    a base panel composed of one or more composite laminate materials as a composite laminate or sandwich structure with face-sheets and core materials;
    a frame including a frame first portion extending from the base panel along a first direction, a frame second portion extending from the frame first portion along a second direction that is perpendicular to the first direction, and a frame third portion extending from the frame first and second portions along a third direction that is perpendicular to the first and second directions, wherein the frame comprises one or more composite laminate materials, and wherein the frame comprises a primary structure of the ULD;
    one or more side panels attached to the frame, the one or more side panels comprising of one or more composite laminate materials; and
    a top panel attached to an opposite end of the frame as the base panel, the top panel comprising of one or more composite laminate materials,
    wherein the frame comprises one or more composite materials wrapped around a plurality of unit beam members, and the plurality of unit beam members each comprise four tubing beam members.

2. The unit load device of claim 1, further comprising a plurality of strips attached to an outer surface of the one or more side panels, the plurality of strips comprising of one or more composite laminate materials.

3. The unit load device of claim 2, wherein the one or more side panels define a top portion adjacent to the top panel, a bottom portion adjacent to the base member, and a middle portion that extends between the top and bottom portion, and wherein there is a greater number of the plurality of strips at the top and bottom portion of the one or more side panels with respect to the middle portion of the one or more side panels in a ply-drop construction configuration.

4. The unit load device of claim 1, wherein the frame comprises a plurality of connectors adjoining the one or more side panels and the top panel to the frame, and wherein the plurality of connectors, comprised of one or more of the following: a hard plastic material, a high strength polymer, and a polymer composite, are attached to the frame via adhesive or mechanical fasteners.

5. The unit load device of claim 1, wherein the frame comprises one or more frame joint assembly brackets.

6. The unit load device of claim 1, wherein the base panel comprises layer comprising Kevlar/epoxy and carbon/epoxy hybrid composite laminate, and wherein the base panel comprises a core layer comprising honeycomb, foam, polycarbonate, polyurethane, or glass/epoxy.

7. The unit load device of claim 1, wherein the unit load device is configured to be contoured such that the unit load device may be received by an interior portion of the airplane.

8. The unit load device of claim 1, further comprising an access door attached to the frame, wherein the unit load device defines an opening, and the access door is configured to cover the opening.

* * * * *